United States Patent
Missett et al.

(10) Patent No.: US 8,989,032 B2
(45) Date of Patent: Mar. 24, 2015

(54) SYSTEMS AND METHODS FOR MEASURING FRAME LOSS IN MULTIPOINT NETWORKS

(75) Inventors: Shaun Noel Missett, Avon, CT (US); Berkay Baykal, Westborough, MA (US); Christopher Thomas Bernard, Wayzata, MN (US)

(73) Assignee: Calix, Inc., Petaluma, CA (US)

( * ) Notice: Subject to any disclaimer, the term of this patent is extended or adjusted under 35 U.S.C. 154(b) by 150 days.

(21) Appl. No.: 13/494,158

(22) Filed: Jun. 12, 2012

(65) Prior Publication Data

US 2013/0329579 A1     Dec. 12, 2013

(51) Int. Cl.
*H04L 12/761* (2013.01)
*H04L 1/00* (2006.01)
*H04L 12/26* (2006.01)

(52) U.S. Cl.
CPC ............ *H04L 43/0835* (2013.01); *H04L 43/16* (2013.01)
USPC ........................................... 370/252

(58) Field of Classification Search
CPC .................................................. H04L 12/2649
See application file for complete search history.

(56) References Cited

U.S. PATENT DOCUMENTS

| | | | |
|---|---|---|---|
| 5,450,394 A | 9/1995 | Gruber et al. | |
| 5,793,976 A | 8/1998 | Chen et al. | |
| 6,188,674 B1 | 2/2001 | Chen et al. | |
| 6,538,997 B1 | 3/2003 | Wang et al. | |
| 7,606,203 B1 | 10/2009 | Shabtay et al. | |
| 7,733,794 B2 | 6/2010 | Damm | |
| 2005/0099949 A1 | 5/2005 | Mohan et al. | |
| 2006/0285501 A1 | 12/2006 | Damm | |
| 2010/0039943 A1* | 2/2010 | Ryoo et al. | 370/242 |
| 2011/0249673 A1* | 10/2011 | Loon et al. | 370/389 |
| 2012/0236734 A1* | 9/2012 | Sampath et al. | 370/252 |
| 2012/0311173 A1* | 12/2012 | Agarwal et al. | 709/231 |
| 2013/0329580 A1 | 12/2013 | Missett et al. | |

OTHER PUBLICATIONS

U.S. Patent and Trademark Office, "Office Action", "from U.S. Appl. No. 13/494,176", Jan. 7, 2014, pp. 1-20, Published in: US.
"Series Y: Global Information Infrastructure, Internet Protocol Aspects and Next-Generation Networks", "Telecommunication Standardization Sector of ITU", May 2006, pp. 25-28, 34-34, 45-46, Publisher: International Telecommunication Union.
"Liaison to IEEE 802.1 Higher Layer Working Group & ITU-T SG12/Q17, SG13/Q5 and SG15/Q9 from MEF Accurate Frame Loss Ad..", Jul. 24, 2008, pp. 1-3.
Pearson, "Accurate Frame Loss Ad-hoc Group Findings and Recommendation", Mar. 2008, pp. 1-14.

(Continued)

*Primary Examiner* — Omar Ghowrwal
(74) *Attorney, Agent, or Firm* — Fogg & Powers LLC

(57) ABSTRACT

Systems and methods for measuring frame loss in multipoint networks are provided. In one embodiment, a method for calculating frame loss in a multipoint network is provided. The method comprises: synchronizing local PM frame count bin boundaries across a multipoint network; collecting a first sample of frame count data at a network manager from a first local PM frame count bin for each VLAN Endpoint on the multipoint network; and calculating a frame loss for the multipoint network by accounting for frame ingress and frame egress from the multipoint network based on the first sample of frame count data; wherein the first sample of frame count data is associated with a first period of time defined by the local PM frame count bin boundaries.

22 Claims, 9 Drawing Sheets

(56) References Cited

OTHER PUBLICATIONS

U.S. Patent and Trademark Office, "Notice of Allowance", "from U.S. Appl. No. 13/494,176", Apr. 22, 2014, pp. 1-9, Published in: US.

U.S. Patent and Trademark Office, "Issue Notification", "from U.S. Appl. No. 13/494,176", Sep. 10, 2014, pp. 1-14, Published in: US.

U.S. Patent and Trademark Office, "Notice of Allowance", "from U.S. Appl. No. 13/494,176", Aug. 18, 2014, pp. 1-14, Published in: US.

"IEEE Standard 802.3—IEEE Standard for Information Technology—Telecommunications and Information Exchange Between Systems—Local and Metropolitan Area Networks—Specific Requirements", "Part 3: Carrier Sense Multiple Access with Collision Detection (CSMA/CD) Access Method and Physical Layer Specifications—Section Three", pp. 1-315, Publisher: IEEE, Date: Jun. 22, 2010.

"IEEE Standard 1076-2008—IEEE Standard VHDL Language Reference Manual", pp. i-626, Publisher: IEEE, Date: Jan. 26, 2009.

"IEEE Standard for Local and Metropolitan Area Networks—Virtual Bridged Local Area Networks Amendment 5: Connectivity Fault Managment", pp. i-246, Publisher: IEEE, Date: Dec. 17, 2007.

"IEEE Standard 802.1Q—2011—IEEE Standard for Local and Metropolitan Area Network—Media Access Control (MAC) Bridges and Virtual Bridge Local Area Networks", Aug. 31, 2011, pp. i-1320, Publisher: IEEE.

"IEEE Standard 802.3—IEEE Standard for Information Technology—Telecommunications and Information Exchange Between Systems—Local and Metropolitan Ara Networks—Specific Requirements", "Part 3: Carrier Sense Multiple Access with Collision Detection (CSMA/CD) Access Method and Physical Layer Specifications—Section One", pp. i-597, Publisher: IEEE, Date: Dec. 26, 2008.

"IEEE Standard 802.3—IEEE Standard for Information Technology—Telecommunications and Information Exchange Between Systems—Local and Metropolitan Ara Networks—Specific Requirements", "Part 3: Carrier Sense Multiple Access with Collision Detection (CSMA/CD) Access Method and Physical Layer Specifications—Section Two", pp. 1-790, Publisher: IEEE, Date: Jun. 22, 2010.

"IEEE—Standard 802.3—IEEE Standard for Information Technology—Telecommunications and Information Exchange Between Systems—Local and Metropolitan Area Networks—Specific Requirements", "IEEE", pp. 1-586, Publisher: Part 3: Carrier Sense Multiple Access with Collision Detection (CSMA/CD) Access Method and Physical Layer Specifications—Section Four, Date: Jun. 22, 2010.

"IEEE Standard 802.3—IEEE Standard for Information Technology—Telecommunications and Information Exchange Between Systems—Local and Metropolitan Area Networks—Specific Requirements", "Part 3: Carrier Sense Multiple Access with Collision Detection (CSMA/CD) Access Method and Physical Layer Specifications—Section Five", pp. 1-615, Publisher: IEEE, Date: Jun. 22, 2010.

"ITU-T G-Series Recommendations Transmission Systems and Media, Digital Systems and Networks; OAM Functions and Mechanisms for Ethernet Based Networks", "Series G: Transmission Systems and Media, Digital Systems and Networks Packet over Transport Aspects—Ethernet over Transport Aspects; Series Y: Global Information Infrastructure, Internet Protocol Aspects and Next-Generation Networks; Internet Protocol Aspects—Operation, Administration and Maintenance", Jul. 2011, pp. 1-92, Publisher: International Telecommunication Union.

"MEF Ethernet Services Definitions, Phase 2—MEF 6.1", "The metro Ethernet Forum", Apr. 2008, pp. i-54.

\* cited by examiner

SYSTEMS AND METHODS FOR MEASURING FRAME LOSS IN MULTIPOINT NETWORKS

CROSS-REFERENCE TO RELATED APPLICATIONS

This application is related to application Ser. No. 13/494,176 filed on even date herewith, entitled "SYSTEMS AND METHODS FOR MEASURING FRAME LOSS 1N MULTIPOINT NETWORKS" and issued as U.S. Pat. No. 8,848,563 on Sep. 30, 2104, which is incorporated herein by reference in its entirety.

BACKGROUND

Performance monitoring and fault management functions are currently utilized to test the reliability of packet delivery over E-Line point-to-point Ethernet service. In a point-to-point service, if the ingress frame count over a period of time for one end point of the E-LINE does not match the egress frame count at the other end point for that period, there is frame loss. There is presently, however, no standard defined solution for multipoint-to-multipoint E-LAN networks. For such a multipoint service, unicast frames that ingress at one endpoint can egress at any other endpoint. Additionally, broadcast and multicast frames are also present which will ingress at one endpoint and egress at multiple endpoints. It becomes exceedingly difficult to match ingress and egress frame counts and to determine where, or if, frame loss is occurring.

One proposed solution utilizes Synthetic frame loss Measurements. This approach assumes that the synthetic frame behavior will be the same as the user frame traffic and uses statistical methods to derive a frame loss Ratio over a long period of time.

However, if there are n endpoints in a VLAN there will be n(n-1)/2 point to point loss measurement sessions required to determine a frame loss ratio between each end point. It turns out that in order to support the required accuracy for the statistical methods to reliably detect an error rate of $10^{-6}$ (which is the accepted threshold of reliability for mobile backhaul applications), the Synthetic frame loss Measurement method will need to send synthetic loss measurement messages every 100 ms. Therefore a VLAN with 8 endpoints in it will require 8(8-1)/2=28 sessions and 2(LMM+LMR)× 10(100 ms rate)×28(sessions)=560 messages per second. Since all messages are processed by the host CPU of each Network Interface Device (NID) this requires quite a powerful CPU to handle this task in addition to all the other aspects of managing the NID and this rate must be supported deterministically under all CPU loading conditions.

For the reasons stated above and for other reasons stated below which will become apparent to those skilled in the art upon reading and understanding the specification, there is a need in the art for improved systems and methods for loss measurement in E-LAN configurations.

SUMMARY

The Embodiments of the present invention provide methods and systems for loss measurement in E-LAN configurations and will be understood by reading and studying the following specification.

In one embodiment, a method for calculating frame loss in a multipoint network is provided. The method comprises: synchronizing local PM frame count bin boundaries across a multipoint network; collecting a first sample of frame count data at a network manager from a first local PM frame count bin for each VLAN Endpoint on the multipoint network; and calculating a frame loss for the multipoint network by accounting for frame ingress and frame egress from the multipoint network based on the first sample of frame count data; wherein the first sample of frame count data is associated with a first period of time defined by the local PM frame count bin boundaries.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present disclosure describes systems and method for monitoring frame loss within a virtual local area network (VLAN). Embodiments of the present invention utilize synchronization of Performance Monitoring (PM) frame count bin boundaries across the VLAN to collect ingress and egress frame count data at a network manager. For example, in one embodiment, ingress and egress frame count data accumulated for a specific 15 minute time period is obtained by a network manager by querying the endpoint nodes on the VLAN for frame count data stored in specific PM frame count bins. Because the boundaries of the PM frame count bins are synchronized, frame count data for the VLAN for a specific time period can be accurately obtained and stored at the network manager. By collecting the ingress and egress frame count data at the network manager, the network manager obtains information which may be utilized to established frame loss statistics for the VLAN.

Figure 1A:
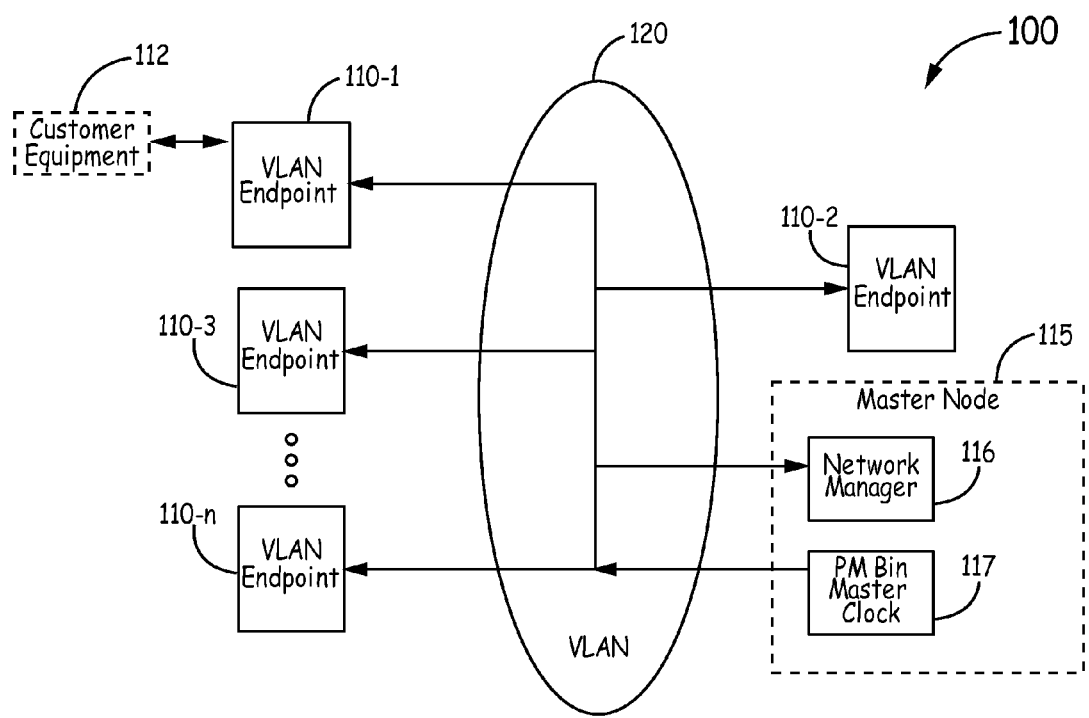
FIG. 1A is a block diagram illustrating a multipoint network of one embodiment of the present invention.

FIG. 1A is a diagram illustrating a multipoint network 100 of one embodiment of the present invention. In one implementation, Network 100 comprises an Ethernet network. In other embodiments, other network protocol and topology implementations may be used. Network 100 comprises network devices that include "n" VLAN Endpoints located on network interface devices (NIDs) shown at 110-1 to 110-n, where "n" is greater than or equal to 3. Within this application, a VLAN Endpoint on an NID will simply be referred to as a "VLAN Endpoint." Network 100 operates as a multipoint network as opposed to a point-to-point network. VLAN Endpoints 110-1 to 110-n are coupled together by a virtual local area network (VLAN) 120 that interconnects each of the VLAN Endpoints 110-1 to 110-n with every other VLAN Endpoint 110-1 to 110-n. In various implementations, VLAN Endpoints 110-1 to 110-n may include combinations of various network devices such as access nodes, network switches, and routers. In one implementation, an E-LAN service operates over VLAN 120, where at least some of the VLAN Endpoints 110-1 to 110-n map frames from a customer's equipment (customer equipment 112 coupled to VLAN Endpoint 110-1, for example) onto an Ethernet Virtual Connection (EVC). In one embodiment, the EVC may be defined by adding an outer service tag (S-Tag), at a given Priority, onto the user frames and transporting them to at least one destination VLAN Endpoint on network 100. As shown in FIG. 1, VLAN 120 provides an isolated broadcast domain. Therefore, once a steady state for network 100 has been reached (e.g., MAC learning has been completed and unicast traffic is being forwarded to destinations on VLAN 120 without flooding) frames that ingress and egress VLAN 120 may be counted in order to measure frame loss. Each ingress unicast frame is counted once on ingress to VLAN 120 and once on egress from VLAN 120. In the case of broadcast and multicast traffic, these frames are counted once on ingress to VLAN 120 and then once for each egress from VLAN 120. With embodiments of the present invention, network 100 also comprises a Master Bin Clock 117 (which synchronizes frame counting into synchronized PM bins as explained below), and a network manager 116 that that collects relevant frame count data from the synchronized PM bin of every other VLAN Endpoint on VLAN 120. From this frame count data, network manager 116 executes one or more algorithms to calculate frame loss measurements for VLAN 120. In one embodiment, the network manager 116 and master bin clock 117 are both integrated into a single master node 115 coupled to VLAN 120. As such, in one embodiment, master node 115 itself comprises one of the VLAN Endpoints 110-1 to 110-n. Alternately, in one embodiment, master node 115 may be indirectly coupled to VLAN 120 via one of VLAN Endpoints 110-1 to 110-n.

Figure 1B:
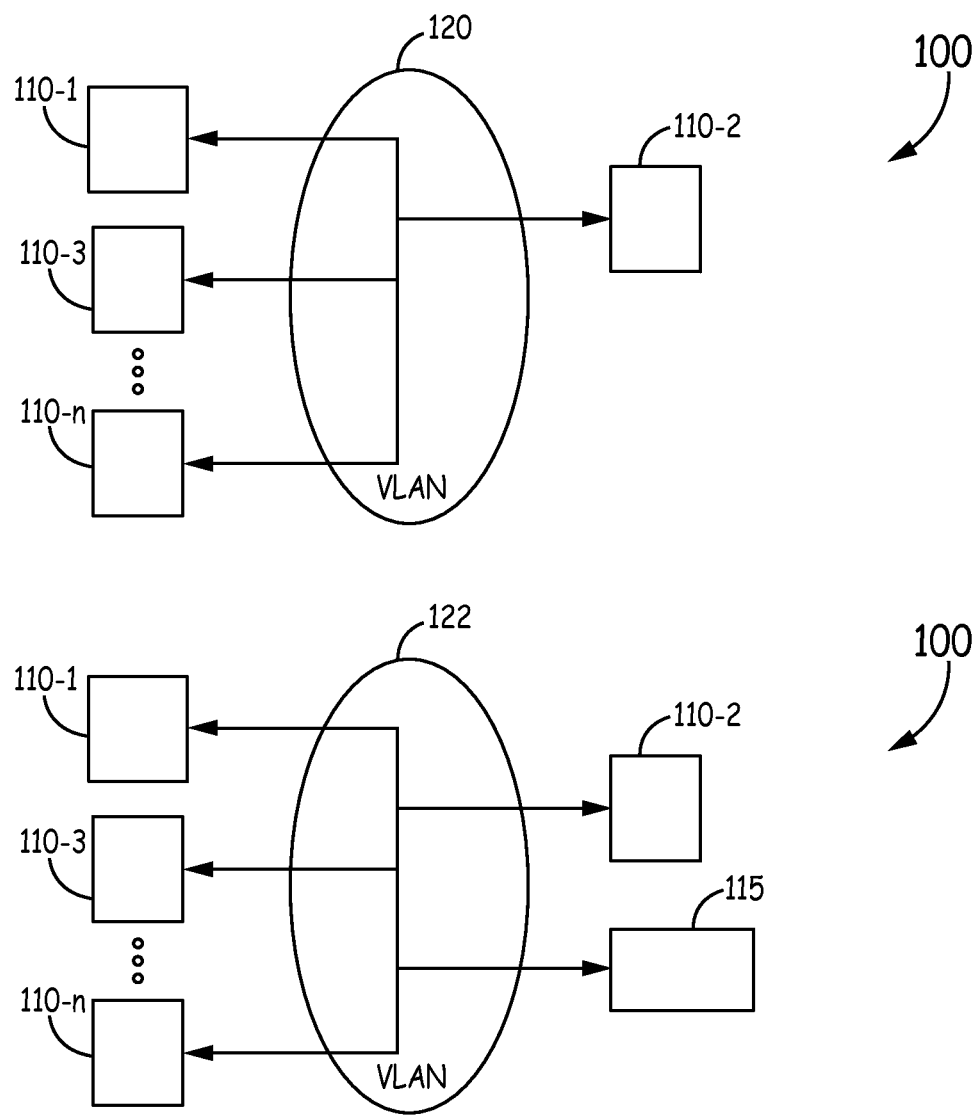
FIG. 1B is a block diagram illustrating an alternate configuration of a multipoint network of one embodiment of the present invention.

FIG. 1B shows yet another configuration at 101 where VLAN Endpoints 110-1 to 110-n communicate via VLAN 120 as described above in FIG. 1A, but the Master Node 115 is connected to each of the VLAN Endpoints 110-1 to 110-n via a management network using a separate VLAN 122 reserved for this purposes.

Figure 1C:
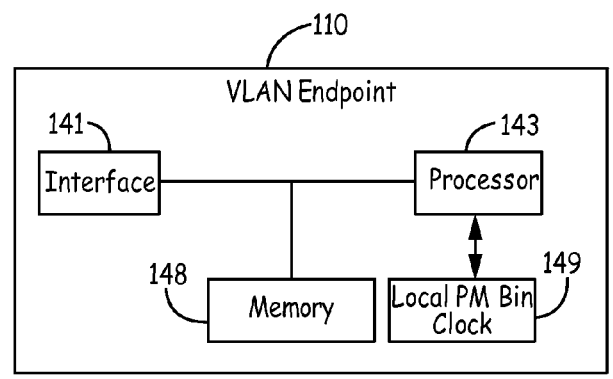
FIGS. 1C and 1D are block diagrams illustrating a VLAN Endpoint network device of one embodiment of the present invention.

FIG. 1C is a block diagram providing an example of one of the VLAN Endpoints 110-1 to 110-n and referred to generally as VLAN Endpoint 110. VLAN Endpoint 110 comprises a network interface 141 for exchanging framed network traffic. Network interface 141 functions to communicatively couple VLAN Endpoint 110 to VLAN 120 (and optionally VLAN 122 for the case of configuration 101). VLAN Endpoint 110 further comprises a processor 143 coupled to a memory 148 and a Local PM Bin Clock 149.

Figure 1D:
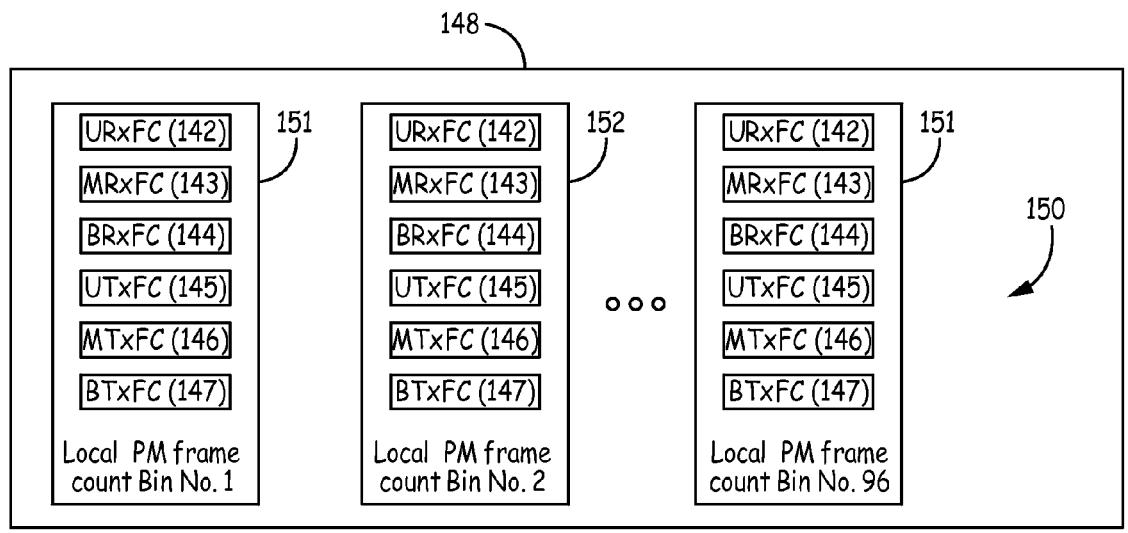

Memory 148 stores one or more local PM frame count bins (shown generally at 150 in FIG. 1D). Each local PM frame count bin stores frame count information accumulated over a specific interval of time. For a specific time period, each local PM frame count bin 150 accumulates and stores frame count data via a set of counters 142, 143, 144, 145, 146, 147. With these local PM frame count bins 150, each VLAN Endpoint 110-1 to 110-n maintains its own frame count for unicast, broadcast and multicast frames transmitted to, and received from, VLAN 120. Each local PM frame count bin 150 may include a received unicast frame counter (URxFC) 142, a received multicast frame counter (MRxFC) 143, a received broadcast frame counter (BRxFC) 144, a transmitted unicast frame counter (UTxFC) 145, a transmitted multicast frame counter (MTxFC) 146, and a transmitted broadcast frame counter (BTxFC) 147.

For example, in one embodiment, local PM frame count bins 150 are each non-overlapping 15 minutes PM frame count bins. For a first 15 minute interval, a first PM frame count bin (shown at 151) counts the frames that ingress into VLAN 120 via interface 141 (that is, frames transmitted by interface 141), and egress from VLAN 120 via interface 141 (that is, frames received by interface 141). A second PM frame count bin (shown at 152) accumulates the same frame count information for the next 15 minute interval. In one embodiment, memory 148 includes 96 local PM frame count bins 150, each collecting frame counts from non-overlapping intervals of time such as to cover a complete 24 hour time period. The use of 15 minute bins should is not meant as a limiting example as in other embodiments, time intervals other than 15 minutes may be used instead.

The time boundaries that define when each local PM frame count bin 150 begins and ends are regulated by the local PM bin clock 149. The local PM bin clock 149 is synchronized with a master bin clock 117 for VLAN 120. Across VLAN 120, each local PM bin clock 149 is synchronized so that the boundaries of local PM frame count bins 150 agree. For example, a local 15 min PM frame count bin No. 1 for a for VLAN Endpoint 110-1 will accumulate frame count information over the same contemporaneous period of time as the local 15 min PM frame count bin No. 1 for every other VLAN Endpoint 110-2 to 110-n, the local 15 min PM frame count Bin No. 2 for VLAN Endpoint 110-1 will accumulate frame count information over the same contemporaneous period of time as the local 15 min PM frame count Bin No. 2 for every other VLAN Endpoint 110-2 to 110-n, and so forth for each of the PM frame count bins 150.

Figure 2A:
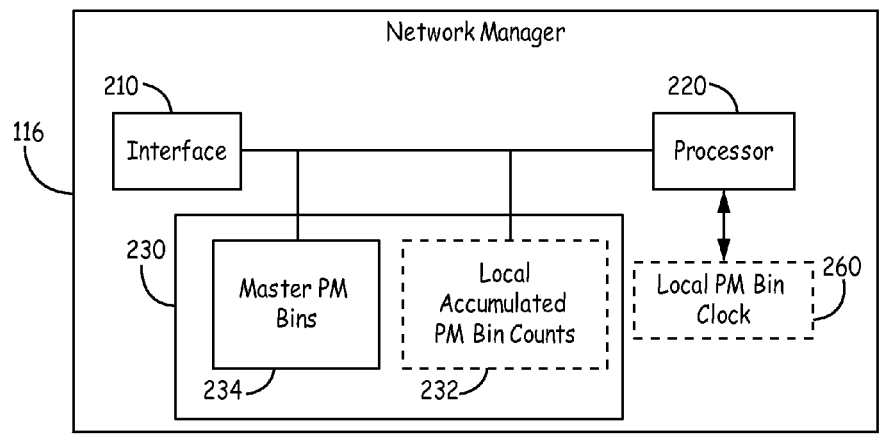
FIGS. 2A and 2B are block diagrams illustrating a network manager network device of one embodiment of the present invention.

FIG. 2A is a diagram illustrating network manager 116 of one embodiment of the present invention as described above with respect to FIG. 1A. For the configuration 100 of FIG. 1A, Network manager 115 comprises a network interface 210 for exchanging framed network traffic with VLAN 120 such as described above with interface 141. For the configuration 101 of FIG. 1B where network manager communicates to VLAN Endpoints 110-1 to 110-n via VLAN 122, the network manager 115 does not need to participate as an VLAN Endpoint to VLAN 120 in order to perform its function. In that case, network interface 210 is used to communicate with VLAN Endpoints 110-1 to 110-n using VLAN 122. Network manager 116 further comprises a processor 220 coupled to a memory 230 and an optional local PM bin clock 260. Memory 230 includes Master PM Count Bins 234 (described in greater detail below).

In the case where Network manager 115 participates as a VLAN Endpoint on VLN 120, Memory 230 may also optionally include a one or more local PM frame count bins (shown at 232) which are structured and function in the same manner describe above with respect to local PM frame count bins 150 to accumulate frame count data for frame traffic transmitted and received via interface 210. In that case, local PM bin clock 260 is synchronized with the Master Bin Clock 117 in the same manner as each local Bin Clock 149 is synchronized so that the boundaries of local PM frame count bins 232 and master PM count bins 234 agree with the local PM frame count bins 150 of VLAN Endpoints 110-1 to 110-n. Where a separate management VLAN 122 is used, the local PM frame count bins 232 and local PM bin clock 260 would not be necessary.

In one embodiment, network manager 116 queries each VLAN Endpoint 110-1 to 110-n requesting that they report back the frame counts (142-147) for specific local PM frame count bins 150. Once the responses are received by network manager 116, this information is stored in the Master Count Bin 234. For embodiments where Network Manger 116 also operates as a VLAN Endpoint on VLAN 120, the frame count data from local PM frame count bins 232 are also added to the Master Count Bin 234. Master Count Bin 234 will thus include the frame count data from the requested PM frame count bins from every VLAN Endpoint 110-1 to 110-n on VLAN 120.

Using this information, Network Manager 116's processor 220 can implement one or more algorithms to calculate frame loss measurements and statistics for all sent and received frames transported through VLAN 120. In one embodiment, each time a set of query responses are received back at Network Manager 116, processor 220 performs a current loss calculation for each frame type by comparing a current sampling of frame count data to a previous sampling of frame count data. An arbitrary number of previous samples may be maintained. In one embodiment, previous calculations will be maintained in memory 230 as previous loss calculation values.

In the case of unicast traffic, there should be a one-to-one correspondence for frames entering VLAN 120 and frames leaving VLAN 120. That is, absent frame loss, the sum of all unicast traffic which ingresses the VLAN 120 and all unicast traffic which egresses the VLAN 120 should match. In one embodiment, a frame loss measurement calculation referred to as the frame loss Ratio, may be performed by network manager 116 by summing all the ingress frame Counts for unicast frames accumulated for a given PM bin No. "X", call this $I_X$, and summing all egress frame Counts for unicast frames accumulated for PM bin number S, call this $E_X$. The Frame Loss Ratio (FLR) Performance can be expressed mathematically as follows:

$$FLR_X = \begin{cases} \left(\frac{I_X - E_X}{I_X}\right) \times 100 & \text{if } I_X \geq 1 \\ 0 & \text{otherwise.} \end{cases}$$

In another embodiment, a frame loss measurement referred to as a frames loss count, is calculated by the Network Manager 116. A frame loss count for unicast, broadcast and multicast frames may be calculated as explained below.

Figure 2B:
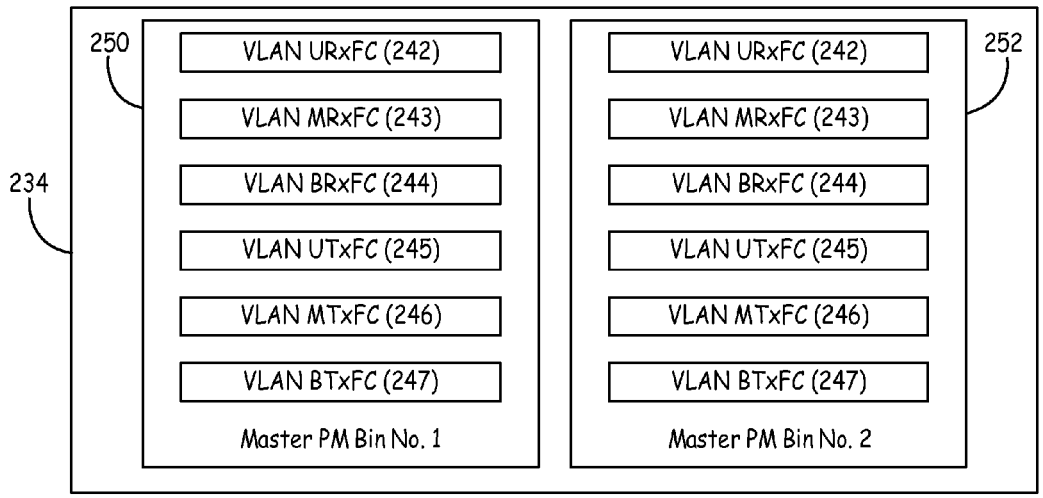

Unicast frame loss count may be calculated as explained in the following example. Processor 220 accesses a first Master PM Bin 234 (Master PM Bin No. 1 shown at 250 in FIG. 2B, for example) and retrieves the egress unicasts frame count data (shown as URxFC 242) for a first time period. This egress unicasts frame count data includes the egress unicast frame counts from every one of the VLAN Endpoints 110-1 to 110-n. Similarly, from the same Master PM Bin No. 1, processor 220 retrieves the ingress unicasts frame count data (shown as UTxFC 245). This ingress unicasts frame count data includes the ingress unicast frame counts from every one of the VLAN Endpoints 110-1 to 110-n. In the same way, processor 230 similarly accesses a second Master PM Bin 234 (Master PM Bin No. 2 shown at 252, for example) and retrieves egress and ingress unicast frame count data for a second time period. A total unicast frame ingress count may be calculated from the difference between the sum of ingress frame counts from Master PM Bin No. 1 and the sum of ingress frame counts from Master PM Bin. No. 2. A total for unicast frame egress count may be calculated from the difference between the sum of egress frame counts from Master PM Bin No. 1 and the sum of egress frame counts from Master PM Bin. No. 2. The unicast frame loss measurement is then calculated from the difference between the unicast frame ingress count and the unicast frame egress count. Where network manger 116 is participating as a VLAN Endpoint of VLAN 120, the egress and ingress frame counts directly observed by network manager 116 would be included in the calculation.

As would be appreciated by one of ordinary skill in the art upon studying this specification, in real-life applications there will be variations in the agreement of PM frame count bin boundaries across VLAN 120 that is a function of how well local PM bin clocks 149 (and 260) are synchronized with the master bin clock 117. However, as frame count data is subsequently collected over successive PM frame count bins, the frame loss value calculated by processor 220 will converge on an increasingly more accurate value.

In this first example, PM frame count bins are not zero based for each time interval. That is, each bins starts counting from the point where the immediately preceding bin finished. An additional example where PM frame count bins are zero based will be provided later in this specification. For this first example, Master Node 115 has already received query responses for frame count data for a first PM frame count bin and a second PM frame count bin, where are stored within its Master PM Bin No. 1 (shown at 310) and Master PM bin No. 2 (shown at 320) as reflected in FIG. 3B. Given the samples of frame count data for the two PM frame count bins, the network manager of Master Node 115 can now calculate frame loss for the VLAN implemented by network 300.

In one embodiment, total unicast ingress frames may be determined from the expressions Ingress Frames=$\Sigma(UT \times A_2, UT \times B_2, UT \times C_2) - \Sigma(UT \times A_1, UT \times B_1, UT \times C_1)$, or Ingress Frames=$(UT \times A_2 - UT \times A_1) + (UT \times B_2 - UT \times B_1) + (UT \times C_2 - UT \times C_1)$ where $UT \times A_1$ is the unicast transmit frame count for VLAN Endpoint A from Master PM Bin No. 1, $UT \times A_2$ is the unicast transmit frame count for VLAN Endpoint A from Master PM Bin No. 2, $UT \times B_1$ is the unicast transmit frame count for VLAN Endpoint B from Master PM Bin No. 1, $UT \times B_2$ is the unicast transmit frame count for VLAN Endpoint B from Master PM Bin No. 2, $UT \times C_1$ is the unicast transmit frame count for VLAN Endpoint C from Master PM Bin No. 1, $UT \times C_2$ is the unicast transmit frame count for VLAN Endpoint C from Master PM Bin No. 2. For the example frame count values provided in FIG. 3B, Ingress Frames=(8000−4000)+(5042−2521)+(3040−1520)=8041

Total unicast egress frames may be determined from the expressions $$\text{Egress Frames} = \Sigma(UR \times A_2, UR \times B_2, UR \times C_2) - \Sigma(UR \times A_1, UR \times B_1, UR \times C_1), \text{ or}$$

$$\text{Egress Frames} = (UR \times A_2 - UR \times A_1) + (UR \times B_2 - UR \times B_1) + (UR \times C_2 - UR \times C_1)$$

where $UR \times A_1$ is the unicast receive frame count for VLAN Endpoint A from Master PM Bin No. 1, $UR \times A_2$ is the unicast receive frame count for VLAN Endpoint A from Master PM Bin No. 2, $UR \times B_1$ is the unicast receive frame count for VLAN Endpoint B from Master PM Bin No. 1, $UR \times B_2$ is the unicast receive frame count for VLAN Endpoint B from Master PM Bin No. 2, $UR \times C_1$ is the unicast receive frame count for VLAN Endpoint C from Master PM Bin No. 1, $UR \times C_2$ is the unicast receive frame count for VLAN Endpoint C from Master PM Bin No. 2. For the example frame count values provided in FIG. 3B, $$\text{Egress Frames} = (6081 - 3040) + (5000 - 2500) + (5000 - 2500) = 8041$$

Figure 3A:
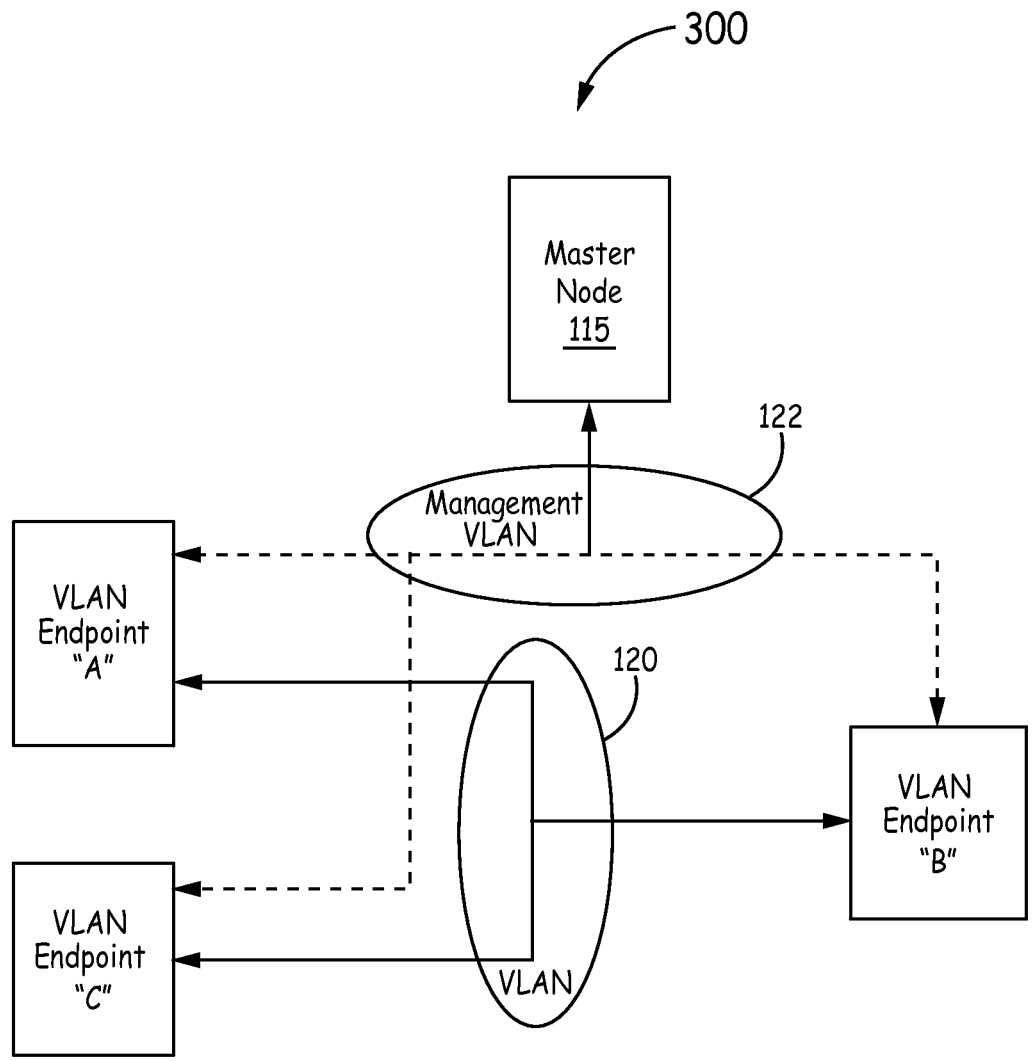
FIG. 3A is a block diagram illustrating an example implementation of an embodiment of the present invention.
Figure 3B:
FIGS. 3B and 3C are diagrams illustrating example Master PM bins for embodiments of the present invention in operation.

An estimated frame loss measurement based on the frame count samples collected in Master PM Bin No. 1 and Master PM Bin No. 2 is determined by:

Unicast Frame Loss = Ingress Frames − Egress Frames and for the example frame count values provided in FIG. 3B, Unicast Frame Loss = 8041 − 8041 = 0

For the case where PM frame count bins are zero based this second example is provided. As used herein, "zero based" means that each PM frame count bin begins accumulating within an initial value of zero at the start of its time period. Accordingly, at the end of its time period, the value in the bin is the number of frames observed. With zero based PM frame count bins, it is not necessary to have two have two PM frame count bin samples. Frame loss can be calculated from every sampling of PM frame count bins. Thus, using frame count data for a first PM frame count bin stored within Master PM Bin No. 1 (shown in FIG. 3C at 330), total unicast ingress frames may be determined from the expressions $$\text{Ingress Frames} = \Sigma(UT \times B_1, UT \times B_1, UT \times C_1)$$

where $UT \times B_1$ is the unicast transmit frame count for VLAN Endpoint A from Master PM Bin No. 1, $UT \times B_1$ is the unicast transmit frame count for VLAN Endpoint B from Master PM Bin No. 1, $UT \times C_1$ is the unicast transmit frame count for VLAN Endpoint C from Master PM Bin No. 1. For the example frame count values provided in FIG. 3C:

Ingress Frames = (4000) + (2521) + (1520) = 8041

Figure 3C:
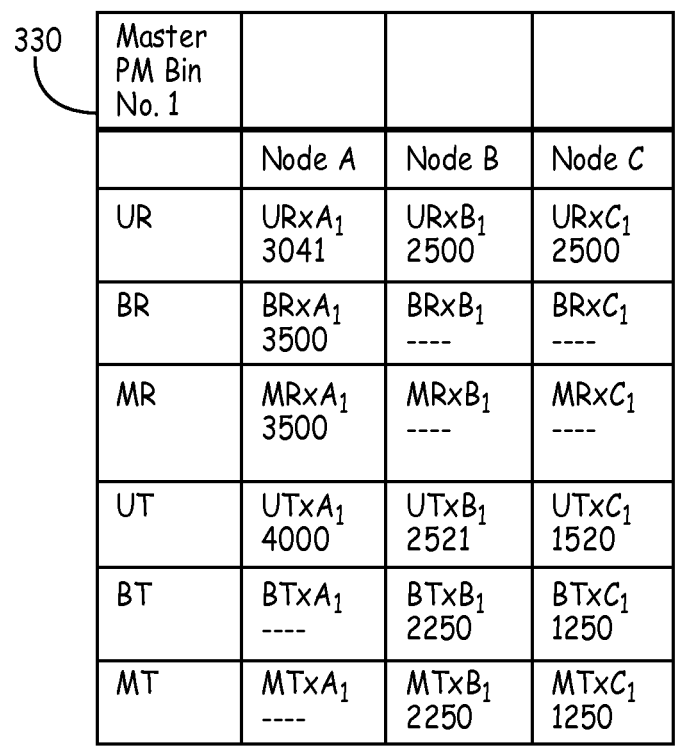

Total unicast ingress frames may be determined from the expression $$\text{Egress Frames} = \Sigma(UR \times A_1, UR \times B_1, UR \times C_1)$$

where $UR \times A_1$ is the unicast receive frame count for VLAN Endpoint A from Master PM Bin No. 1, $UR \times B_1$ is the unicast receive frame count for VLAN Endpoint B from Master PM Bin No. 1, $UR \times C_1$ is the unicast receive frame count for VLAN Endpoint C from Master PM Bin No. 1, For the example frame count values provided in FIG. 3C:

Egress Frames = (3041) + (2500) + (2500) = 8041

An estimated frame loss measurement based on the zero based frame count samples collected in Master PM Bin No. 1 is determined by:

Unicast Frame Loss = Ingress Frames − Egress Frames and for the example frame count values provided in FIG. 3C:

Unicast Frame Loss = 8041 − 8041 = 0

Frame loss measurement calculations for broadcast and multicast traffic for a network is treated slightly differently. Since each VLAN Endpoint 110-1 to 110-n in VLAN 120 can count its' own ingress broadcast and multicast traffic, a frame loss calculation can utilize the fact that all VLAN Endpoints on VLAN 120 should receive all broadcast and multicast frames transmitted from all the other VLAN Endpoints on VLAN 120. Therefore, in the absence of frame loss, a count of all broadcast (or multicast) frames received by any given VLAN Endpoint should be equal to the sum of all broadcast (or multicast) frames transmitted by all other VLAN Endpoints.

For example, referring back to FIGS. 3A and 3B, a frame loss for broadcast frames may be determined by Master Node 115 from the total number of broadcast frame received at a first node (VLAN Endpoint A, for example) subtracted from the total number of all broadcast frames transmitted by all other nodes (i.e., VLAN Endpoints B & C). For network 300 with PM frame count bins not zero based, this is equivalent to the expressions:

$$\text{Broadcast Frame Loss} = [\Sigma(BT \times B_2, BT \times C_2) - \Sigma(BT \times B_1, BT \times C_1)] - (BR \times A_2 - BR \times A_1), \text{ or}$$

$$\text{Broadcast Frame Loss} = [(BT \times B_2 - BT \times B_1) + (BT \times C_2 - BT \times C_1)] - (BR \times A_2 - BR \times A_1)$$

where $BR \times A_1$ is the broadcast receive frame count for VLAN Endpoint A from Master PM Bin No. 1, $BR \times A_2$ is the broadcast receive frame count for VLAN Endpoint A from Master PM Bin No. 2, $BT \times B_1$ is the broadcast transmit frame count for VLAN Endpoint B from Master PM Bin No. 1, $BT \times B_2$ is the broadcast transmit frame count for VLAN Endpoint B from Master PM Bin No. 2, $BT \times C_1$ is the broadcast transmit frame count for VLAN Endpoint C from Master PM Bin No. 1, $BT \times C_2$ is the broadcast transmit frame count for VLAN Endpoint C from Master PM Bin No. 2. For the example frame count values provided in FIG. 3B, Broadcast Frame Loss = [(3000 − 0750) + (6500 − 5250)] − (4500 − 1000) = 0

For network 300 with PM frame count bins zero based, Master Node 115 may perform an calculation equivalent to the expression:

$$\text{Broadcast Frame Loss} = \Sigma(BT \times B_1, BT \times C_1) - (BR \times A_1),$$

where $BR \times A_1$ is the broadcast receive frame count for VLAN Endpoint A from Master PM Bin No. 1, $BT \times B_1$ is the broadcast transmit frame count for VLAN Endpoint B from Master PM Bin No. 1, $BT \times C_1$ is the broadcast transmit frame count for VLAN Endpoint C from Master PM Bin No. 1. For the example frame count values provided in FIG. 3C, Broadcast Frame Loss = [(2250) + (1250)] − (3500) = 0

Similarly, a frame loss for multicast frames from VLAN 120 may be determined by Master Node 115 from the total number of multicast frame received at a first node (VLAN Endpoint A, for example) subtracted from the total number of all multicast frames transmitted by all other nodes (i.e., VLAN Endpoints B & C). For network 300 with PM frame count bins not zero based, this is equivalent to the expressions:

$$\text{Multicast Frame Loss} = [\Sigma(MT \times B_2, MT \times C_2) - \Sigma(MT \times B_1, MT \times C_1)] - (MR \times A_2 - MR \times A_1), \text{ or}$$

$$\text{Multicast Frame Loss} = [(MT \times B_2 - MT \times B_1) + (MT \times C_2 - MT \times C_1)] - (MR \times A_2 - MR \times A_1)$$

where $MR \times A_1$ is the multicast receive frame count for VLAN Endpoint A from Master PM Bin No. 1, $MR \times A_2$ is the multicast receive frame count for VLAN Endpoint A from Master PM Bin No. 2, $MT \times B_1$ is the multicast transmit frame count for VLAN Endpoint B from Master PM Bin No. 1, $MT \times B_2$ is the multicast transmit frame count for VLAN Endpoint B from Master PM Bin No. 2, $MT \times C_1$ is the multicast transmit frame count for VLAN Endpoint C from Master PM Bin No. 1, $MT \times C_2$ is the multicast transmit frame count for VLAN Endpoint C from Master PM Bin No. 2. For the example frame count values provided in FIG. 3B:

Multicast Frame Loss=[(3900−2900)+(4750−3650)]−(3500−1400)=0

For network 300 with PM frame count bins zero based, Master Node 115 may perform an calculation equivalent to the expression:

Multicast Frame Loss=Σ($MT \times B_1, MT \times C_1$)−($MR \times A_1$), where $MR \times A_1$ is the broadcast receive frame count for VLAN Endpoint A from Master PM Bin No. 1, $MT \times B_1$ is the broadcast transmit frame count for VLAN Endpoint B from Master PM Bin No. 1, $MT \times C_1$ is the broadcast transmit frame count for VLAN Endpoint C from Master PM Bin No. 1. For the example frame count values provided in FIG. 3C:

Multicast Frame Loss=[(2250)+(1250)]−(3500)=0

Figure 4A:
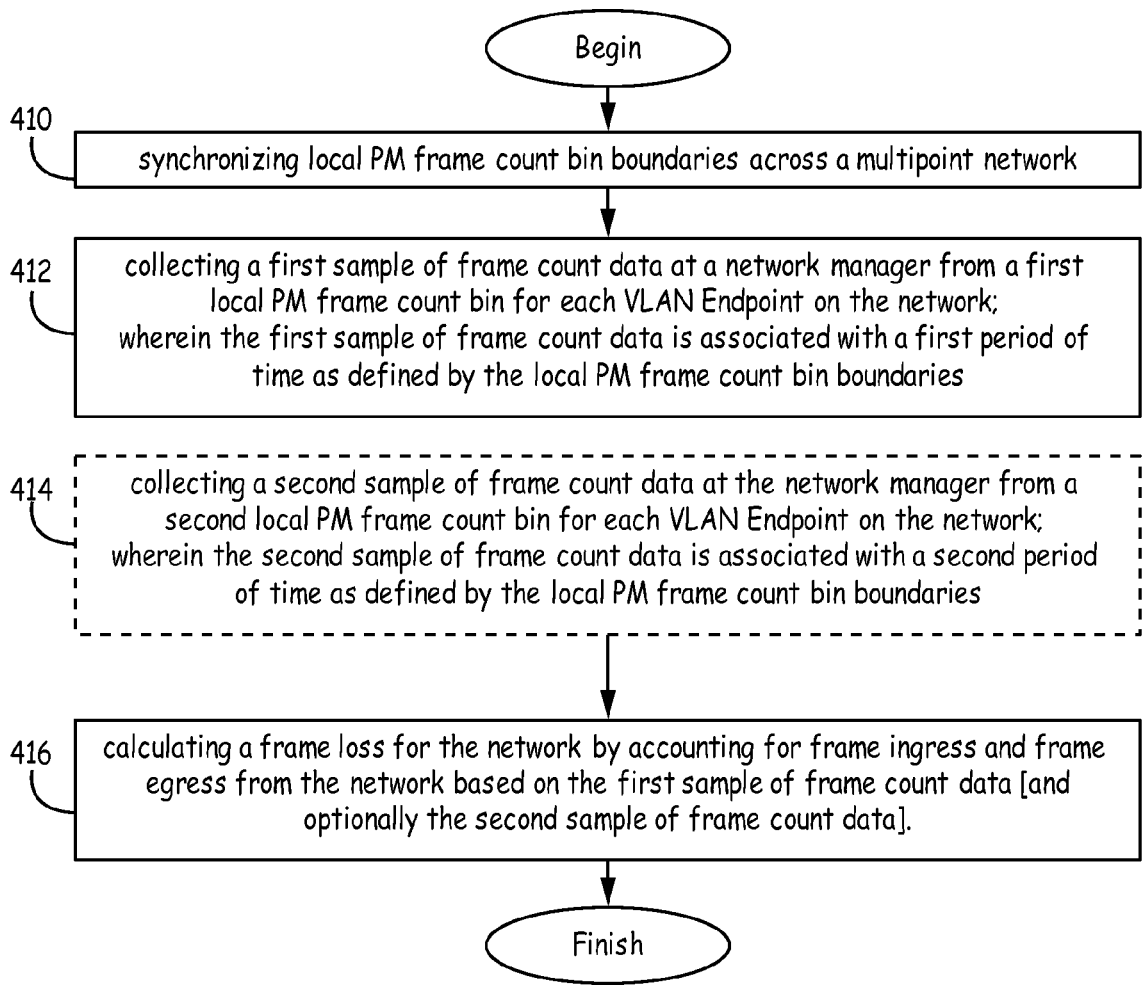
FIGS. 4A and 4B illustrate methods of embodiments of the present invention.
Figure 4B:
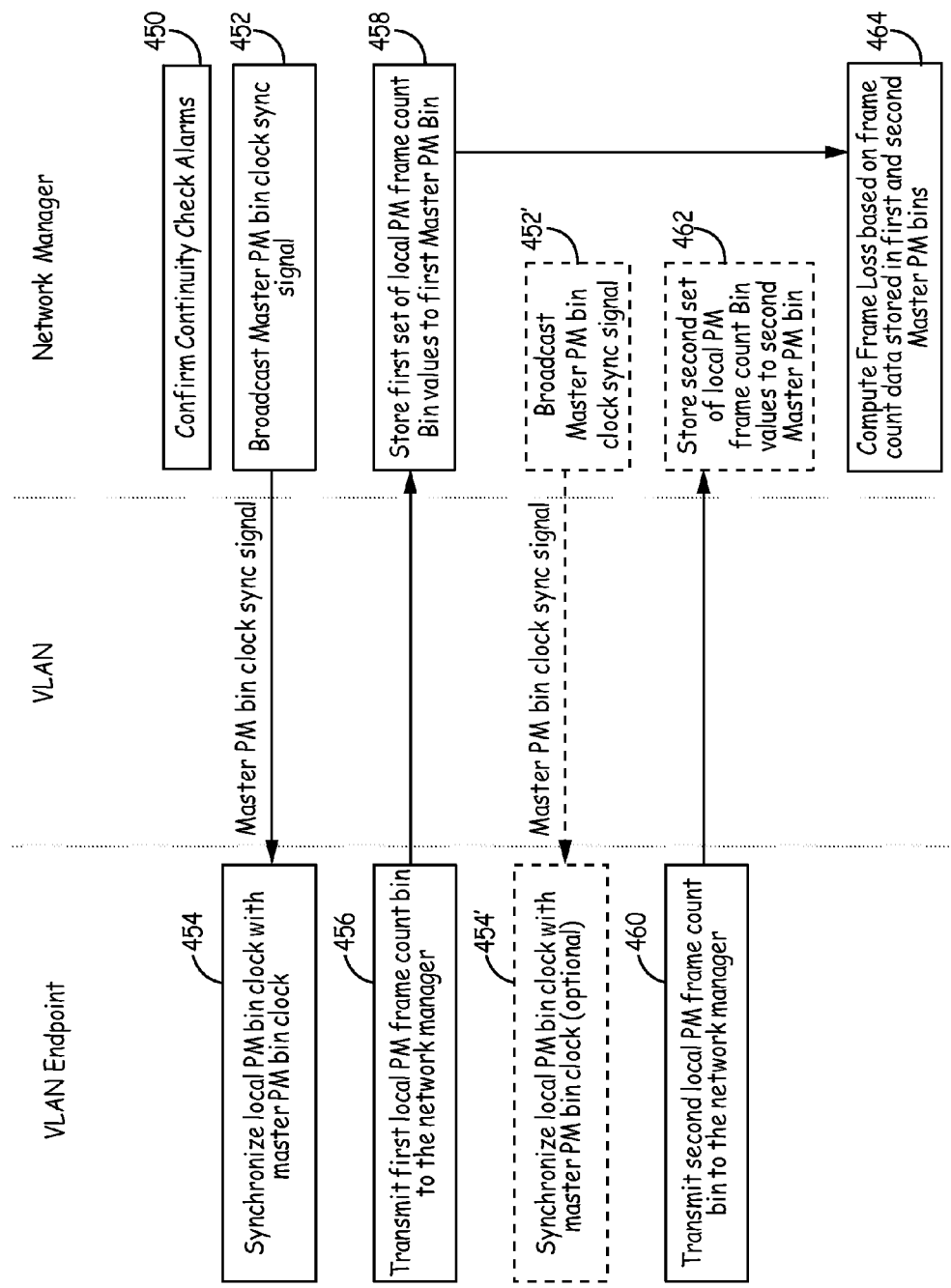

FIGS. 4A and 4B respectively provide a process flow chart and message flow diagram illustrating a method of one embodiment of the present invention for calculating frame loss measurements in a multipoint network implementing a VLAN having a plurality of VLAN Endpoints. The process described in FIGS. 4A and 4B may be implemented in combination with any of the embodiments and configurations described above. For example, in alternate embodiments, the Network Manager may be a participating VLAN Endpoint in the VLAN (such as in FIG. 1B), or may communicate with the VLAN Endpoints over a secondary management VLAN (such as in FIG. 1B).

The method begins at 410 with synchronizing local PM frame count bin boundaries across a multipoint network. In one embodiment, local PM Bin clocks located at each VLAN Endpoint are synchronized with each other by a master PM Bin clock on the VLAN. That is, the time boundaries that define when each local PM frame count bin begins and ends are regulated at each VLAN Endpoint by their local PM bin clock. The local PM bin clock is synchronized with the master PM bin clock. Therefore, across the VLAN, each local PM bin clock at each VLAN Endpoint is synchronized so that the boundaries of local PM frame count bins agree. Referring to FIG. 4B, in one embodiment, after the network manager confirms that any continuity check alarms are clear (shown at block 450), the network manager instructs the master PM bin clock to synchronize the local PM bin clocks. The master PM bin clock broadcasts a clock sync signal (shown at block 452) which is received by the VLAN Endpoints and used to synchronize their local PM bin clock.

The method the proceeds to 412 with collecting a first sample of frame count data at a network manager from a first local PM frame count bin for each VLAN Endpoint on the network. The first sample of frame count data is associated with a first period of time as defined by the local PM frame count bin boundaries. In one embodiment, the first sample of frame count data is collected at the network manager by having the VLAN Endpoints transmit the contents of a first local PM frame count bin to the network manager (shown at block 456). In some embodiments, transmission of the contents of the first local PM frame count bin is triggered in response to a query message for the information from the network manager. Alternately, transmission of the contents of the first local PM frame count bin may be automatically initiated by the VLAN Endpoints. For example, in one embodiment, a VLAN Endpoint automatically transmits the contents of the first local PM frame count bin shortly after (e.g. after a predefined delay)) the time period associated with the first local PM frame count bin ends. Reception of the first local PM frame count bin values forms the first sample of frame count data, which is stored at the network manager in a first Master PM Bin (shown at block 458).

In one embodiment, where zero based PM frame count bins are utilized, the method proceeds directly to 416 with calculating a frame loss for the network by accounting for frame ingress and frame egress from the network based on the first sample of frame count data. This is illustrated in FIG. 4B at block 464 where the network manager computes a frame loss based on the frame count data stored in the first Master PM Bin. The frame data collected may include unicast, multicast and broadcast traffic as described above with respect to any of the Figures described herein. As such, calculating the frame loss can comprise calculating any combination of the unicast frame loss, multicast frame loss, broadcast frame loss, and frame loss Ratios using any of the means described above.

In one embodiment, where zero based PM frame count bins are not utilized, the method the proceeds first to optional block 414 (before proceeding to 416) with collecting a second sample of frame count data at the network manager from a second local PM frame count bin for each VLAN Endpoint on the network. The second sample of frame count data is associated with a second period of time as defined by the local PM frame count bin boundaries. In one embodiment, the second sample of frame count data is collected at the network manager by having the VLAN Endpoints transmit the contents of a the local PM frame count bin to the network manager (shown at block 460). In some embodiments, transmission of the contents of the second local PM frame count bin is triggered in response to a query message for the information from the network manager. Alternately, transmission of the contents of the second local PM frame count bin may be automatically initiated by the VLAN Endpoints. For example, in one embodiment, a VLAN Endpoint automatically transmits the contents of the second local PM frame count bin shortly after (e.g. after a predefined delay) the time period associated with the second local PM frame count bin ends. Transmissions of the second local PM frame count bin values forms the second sample of frame count data, which is stored at the network manager in a second Master PM Bin (shown at block 462).

For this alternate embodiment, after bock 414, the method then proceeds to 416 with calculating a frame loss for the network by accounting for frame ingress and frame egress from the network based on the first sample of frame count data and the second sample of frame count data. This is illustrated in FIG. 4B at block 464 where the network manager computes a frame loss based on the frame count data stored in the first and second Master PM Bins. The frame data collected may include unicast, multicast and broadcast traffic as described above with respect to any of the Figures described herein. As such, calculating the frame loss can comprise calculating any combination of the unicast frame loss, multicast frame loss, broadcast frame loss, and frame loss Ratios using any of the means described above.

In one or more additional alternative embodiments, while the network manager may collect and/or store the frame count data in Master PM Bins as described above, another device may query the network manager for the data and actually perform the calculation at 416. Further, for any of the above described embodiments, should the calculation determine that a frame loss measurement exceeds a threshold acceptance criteria, a more refined frame loss detection scheme, such as a point-to-point frame loss analysis, may be initiated on the network to more specifically where on the network frame loss is occurring.

In some embodiments, synchronizing local PM frame count bin boundaries at each of the plurality of VLAN Endpoints on the multipoint network (step 410) is repeated during the execution of the method (for example, periodically or per a schedule) and may be performed independent of the collection of first and second samples of frame count data at 412 and 414. This is illustrated in FIG. 4B by the optional blocks 452' and 454'.

EXAMPLE EMBODIMENTS

Example 1 includes a method for calculating frame loss in a multipoint network, the method comprising: synchronizing local PM frame count bin boundaries across a multipoint network; collecting a first sample of frame count data at a network manager from a first local PM frame count bin for each VLAN Endpoint on the multipoint network; and calculating a frame loss for the multipoint network by accounting for frame ingress and frame egress from the multipoint network based on the first sample of frame count data; wherein the first sample of frame count data is associated with a first period of time defined by the local PM frame count bin boundaries.

Example 2 includes the method of example 1, wherein the multipoint network is a multipoint virtual local area network (VLAN).

Example 3 includes the method of any of examples 1-2, wherein the network manager collects frame count data by communicating with each VLAN Endpoint on the multipoint network via a management network separate from the multipoint network.

Example 4 includes the method of any of examples 1-3, wherein the first set of frame count data comprises egress and Ingres frame counts for unicast traffic; and wherein calculating the frame loss further comprises determining a difference between a sum of all unicast frame traffic which ingressed the multipoint network and a sum of all unicast frame traffic which egressed the multipoint network.

Example 5 includes the method of any of examples 1-4, further comprising: collecting a second sample of frame count data at the network manager from a second local PM frame count bin for each VLAN Endpoint on the network; wherein the second sample of frame count data is associated with a second period of time defined by the local PM frame count bin boundaries; and
wherein calculating a frame loss for the multipoint network further comprises accounting for frame ingress and frame egress from the multipoint network based on the first sample of frame count data and the second sample of frame count data.

Example 6 includes the method of any of examples 1-5, wherein the first set of frame count data and the second set of frame count data each comprise egress and Ingres frame counts for unicast traffic; and wherein calculating the frame loss further comprises comparing the first sample of frame count data to the second sample of frame count data to determine a difference between a sum of all unicast frame traffic which ingressed the multipoint network and a sum of all unicast frame traffic which egressed the multipoint network.

Example 7 includes the method of any of examples 1-6, wherein the first sample of frame count data comprises egress and Ingres frame counts for one or both of multicast traffic and broadcast traffic.

Example 8 includes the method of any of examples 1-7, wherein calculating the frame loss further comprises calculating a difference between a frame count of broadcast frames received at a first VLAN Endpoint and frame count of broadcast frames transmitted by a plurality of other VLAN Endpoints based on broadcast traffic frame counts collected in the first sample of frame count data.

Example 9 includes the method of any of examples 1-8, wherein calculating the frame loss further comprises calculating a difference between a frame count of multicast frames received at a first VLAN Endpoint and frame count of multicast frames transmitted by a plurality of other VLAN Endpoints based on multicast traffic frame counts collected in the first sample of frame count data.

Example 10 includes the method of any of examples 1-9, wherein synchronizing local PM frame count bin boundaries across the multipoint network further comprises: synchronizing a local PM Bin clock at each VLAN Endpoint on the multipoint network with a master PM Bin clock.

Example 11 includes the method of any of examples 1-10, wherein synchronizing local PM frame count bin boundaries across the multipoint network further comprises the network manager instructing the master PM bin clock to synchronize the local PM bin clock at each VLAN Endpoint on the multipoint network.

Example 12 includes the method of any of examples 1-11, wherein collecting a first sample of frame count data at the network manager from the first local PM frame count bin for each VLAN Endpoint on the multipoint network further comprises: transmitting a query message from the network manager to a each VLAN Endpoint, wherein each VLAN Endpoint responds to the query message by transmitting contents of the first local PM frame count bin to the network manager.

Example 13 includes the method of any of examples 1-12, further comprising: initiating an additional frame loss analysis when the frame loss calculated exceeds a threshold value.

Example 14 includes a network device for determining frame loss on a multipoint network, the network device comprising: an interface coupled to a multipoint network that is coupled to a plurality of other network devices, the interface configured to exchange framed traffic with the multipoint network; a first memory of local PM frame count bins storing frame count data for frames transmitted and received via the interface; a local PM bin clock configured to synchronize with a Master PM bin clock on the multipoint network; a processor coupled to the interface and the memory, wherein the processor determines time boundaries that define when each of the local PM frame count bins begins and ends based on time periods measured by the local PM bin clock; and wherein the processor is configured to transmit frame count data from at least a first local PM frame count bin to a network manager.

Example 15 includes the network device of example 14, wherein the frame count data includes frame counts for at least one of unicast frame traffic, multicast frame traffic, or broadcast frame traffic.

Example 16 includes the network device of any of examples 14-15, wherein the multipoint network is a multipoint virtual local area network (VLAN).

Example 17 includes the network device of any of examples 14-16, wherein the interface communicates with the network manager via a management network separate from the multipoint network.

Example 18 includes a network device for determining frame loss on a multipoint network, the network device comprising: an interface coupled to a plurality of VLAN Endpoints, wherein the plurality of VLAN Endpoints are coupled to each other over a multipoint network; a first memory of Master PM bins storing frame count data for the multipoint network collected from the plurality of VLAN Endpoints; and a processor coupled to the interface and the memory, wherein the processor determines a frame loss measurement for the multipoint network by: collecting at least a first sample of frame count data from a first local PM frame count bin from each of the plurality of VLAN Endpoints on the multipoint network and storing the first sample of frame count data into a first Master PM bin of the first memory; wherein the processor calculates a frame loss measurement for the multipoint network by accounting for frame ingress and frame egress from the multipoint network based on the first sample of frame count data.

Example 19 includes the network device of example 18, wherein the frame count data includes frame counts for at least one of unicast frame traffic, multicast frame traffic, or broadcast frame traffic.

Example 20 includes the network device of any of examples 18-19, wherein the multipoint network is a multipoint virtual local area network (VLAN).

Example 21 includes the network device of any of examples 18-20, wherein the interface is coupled to a management network separate from the multipoint network, wherein the network manager collects frame count data by communicating with each VLAN Endpoint on management network.

Example 22 includes the network device of any of examples 18-21, wherein the processor calculates a frame loss measurement for the multipoint network by further: collecting at least a second sample of frame count data from a second local PM frame count bin from each of the plurality of VLAN Endpoints on the multipoint network and storing the second sample of frame count data into a second Master PM bin of the first memory; and wherein the processor calculates the frame loss measurement for the multipoint network by accounting for frame ingress and frame egress from the multipoint network based on the first sample of frame count data and the second sample of frame count data.

Example 23 includes the network device of any of examples 18-22, wherein local PM frame count bin boundaries at VLAN Endpoints across the multipoint network are synchronized to a mater PM Bin clock; wherein the first sample of frame count data is associated with a first period of time defined by the local PM frame count bin boundaries; wherein the second sample of frame count data is associated with a second period of time defined by the local PM frame count bin boundaries.

Example 24 includes the network device of any of examples 18-23, further comprising: a second memory of local PM frame count bins storing frame count data for frames transmitted and received via the interface; and a local PM bin clock configured to synchronize with the Master PM bin clock; wherein the processor further determines time boundaries that define when each of the local PM frame count bins begins and ends based on time periods measured by the local PM bin clock.

Example 25 includes the network device of any of examples 18-24, wherein the processor calculates a unicast frame loss measurements from the first sample of frame count data based on a difference between a sum of all unicast frame traffic which ingressed the multipoint network and a sum of all unicast frame traffic which egressed the multipoint network.

Example 26 includes the network device of any of examples 18-25, wherein the processor calculates one or both of a broadcast frame loss measurement and a multicast frame loss measurement by: calculating a difference between a frame count of frames received at a first VLAN Endpoint on the multipoint network and a frame count of frames transmitted by every other VLAN Endpoint on the multipoint network based at least on part on traffic frame counts collected in the first sample of frame count data.

Several means are available to implement the embodiments discussed in this specification. These means include, but are not limited to, digital computer systems, embedded processors, microprocessors, general purpose computers, programmable controllers and field programmable gate arrays (FPGAs) or application-specific integrated circuits (ASICs). For example, for some embodiments, an algorithm stored in memory 148 is executed by processor 143 for performing the process described with respect to FIGS. 4A-4B or any other of the functions or calculations described herein. Therefore one or more embodiments of the present invention are program instructions resident on non-transient computer readable media which when implemented by such means enable them to implement embodiments of the present invention. Computer readable media for the memory and storage devices describe above include any form of a physical computer memory storage device. Examples of such a physical computer memory device include, but is not limited to, punch cards, firmware, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for calculating frame loss in a multipoint network, the method comprising:
   synchronizing local Performance Monitoring (PM) frame count bin boundaries across at least three VLAN Endpoints of a multipoint network;
   receiving a first sample of frame count data at a network manager from a first local PM frame count bin from each of the at least three VLAN Endpoints on the multipoint network, wherein the first local PM frame count bin for each of the at least three VLAN Endpoints is defined by a beginning time boundary and an ending time boundary, and the first local PM frame count bin boundaries for each of the at least three VLAN Endpoints are synchronized so that their respective beginning and ending time boundaries agree; and
   calculating a frame loss for frames transported through the multipoint network by accounting for frame ingress and frame egress from the multipoint network through the at least three VLAN Endpoints based on the first sample of frame count data;
wherein the first sample of frame count data includes a number of frames that ingress at each of the at least three VLAN Endpoints and a number of frames that egress at each of the at least three VLAN Endpoints during a first period of time defined by the local PM frame count bin boundaries.

2. The method of claim 1, wherein the multipoint network is a multipoint virtual local area network (VLAN).

3. The method of claim 1, wherein the network manager collects frame count data by communicating with each VLAN Endpoint on the multipoint network via a management network separate from the multipoint network.

4. The method of claim 1, wherein the first set of frame count data comprises egress and ingress frame counts for unicast traffic; and
wherein calculating the frame loss further comprises determining a difference between a sum of all unicast frame traffic which ingressed the multipoint network and a sum of all unicast frame traffic which egressed the multipoint network.

5. The method of claim 1, further comprising:
collecting a second sample of frame count data at the network manager from a second local PM frame count bin for each VLAN Endpoint on the network;
wherein the second sample of frame count data is associated with a second period of time defined by the local PM frame count bin boundaries; and
wherein calculating a frame loss for the multipoint network further comprises accounting for frame ingress and frame egress from the multipoint network based on the first sample of frame count data and the second sample of frame count data.

6. The method of claim 5, wherein the first set of frame count data and the second set of frame count data each comprise egress and ingress frame counts for unicast traffic; and
wherein calculating the frame loss further comprises comparing the first sample of frame count data to the second sample of frame count data to determine a difference between a sum of all unicast frame traffic which ingressed the multipoint network and a sum of all unicast frame traffic which egressed the multipoint network.

7. The method of claim 1, wherein the first sample of frame count data comprises egress and ingress frame counts for one or both of multicast traffic and broadcast traffic.

8. The method of claim 7, wherein calculating the frame loss further comprises calculating a difference between a frame count of broadcast frames received at a first VLAN Endpoint and frame count of broadcast frames transmitted by a plurality of other VLAN Endpoints based on broadcast traffic frame counts collected in the first sample of frame count data.

9. The method of claim 7, wherein calculating the frame loss further comprises calculating a difference between a frame count of multicast frames received at a first VLAN Endpoint and frame count of multicast frames transmitted by a plurality of other VLAN Endpoints based on multicast traffic frame counts collected in the first sample of frame count data.

10. The method of claim 1, wherein synchronizing local PM frame count bin boundaries across the multipoint network further comprises:
synchronizing a local PM Bin clock at each VLAN Endpoint on the multipoint network with a master PM Bin clock.

11. The method of claim 10, wherein synchronizing local PM frame count bin boundaries across the multipoint network further comprises the network manager instructing the master PM bin clock to synchronize the local PM bin clock at each VLAN Endpoint on the multipoint network.

12. The method of claim 1, wherein receiving a first sample of frame count data at the network manager from the first local PM frame count bin for each of the at least three VLAN Endpoints on the multipoint network further comprises:
transmitting a query message from the network manager to each of the at least three VLAN Endpoints, wherein each of the at least three VLAN Endpoints responds to the query message by transmitting contents of the first local PM frame count bin to the network manager.

13. The method of claim 1, further comprising:
initiating an additional frame loss analysis when the frame loss calculated exceeds a threshold value.

14. A network device for determining frame loss on a multipoint network, the network device comprising:
an interface coupled to at least three VLAN Endpoints coupled to each other over a multipoint network;
a first memory of Master Performance Monitoring (PM) bins storing frame count data for the multipoint network collected from the at least three VLAN Endpoints; and
a processor coupled to the interface and the memory, wherein the processor determines a frame loss measurement for frames transported through the multipoint network by:
receiving at least a first sample of frame count data from a first local PM frame count bin from each of the at least three VLAN Endpoints on the multipoint network and storing the first sample of frame count data into a first Master PM bin of the first memory, wherein the first local PM frame count bin for each of the at least three VLAN Endpoints is defined by a beginning time boundary and an ending time boundary, and the first local PM frame count bin for each of the at least three VLAN Endpoints are synchronized so that their respective beginning and ending time boundaries agree;
wherein the first sample of frame count data includes a number of frames that ingress at each of the at least three VLAN Endpoints and a number of frames that egress at each of the at least three VLAN Endpoints during a first period of time defined by the local PM frame count bin boundaries;
wherein the processor calculates a frame loss measurement for the multipoint network by accounting for frame ingress and frame egress from the multipoint network based on the first sample of frame count data.

15. The network device of claim 14, wherein the frame count data includes frame counts for at least one of unicast frame traffic, multicast frame traffic, or broadcast frame traffic.

16. The network device of claim 14, wherein the multipoint network is a multipoint virtual local area network (VLAN).

17. The network device of claim 14, wherein the interface is coupled to a management network separate from the multipoint network, wherein the network manager collects frame count data by communicating with each VLAN Endpoint on management network.

18. The network device of claim 14, wherein the processor calculates a frame loss measurement for the multipoint network by further:
collecting at least a second sample of frame count data from a second local PM frame count bin from each of the at least three VLAN Endpoints on the multipoint network and storing the second sample of frame count data into a second Master PM bin of the first memory; and wherein the processor calculates the frame loss measurement for the multipoint network by accounting for frame ingress and frame egress from the multipoint network based on the first sample of frame count data and the second sample of frame count data.

19. The network device of claim 18, wherein local PM frame count bin boundaries at VLAN Endpoints across the multipoint network are synchronized to a master PM Bin clock;

wherein the first sample of frame count data is associated with a first period of time defined by the local PM frame count bin boundaries;

wherein the second sample of frame count data is associated with a second period of time defined by the local PM frame count bin boundaries.

20. The network device of claim 14, further comprising:

a second memory of local PM frame count bins storing frame count data for frames transmitted and received via the interface; and a local PM bin clock configured to synchronize with the Master PM bin clock;

wherein the processor further determines time boundaries that define when each of the local PM frame count bins begins and ends based on time periods measured by the local PM bin clock.

21. The network device of claim 14, wherein the processor calculates a unicast frame loss measurements from the first sample of frame count data based on a difference between a sum of all unicast frame traffic which ingressed the multipoint network and a sum of all unicast frame traffic which egressed the multipoint network.

22. The network device of claim 14, wherein the processor calculates one or both of a broadcast frame loss measurement and a multicast frame loss measurement by:

calculating a difference between a frame count of frames received at a first VLAN Endpoint on the multipoint network and a frame count of frames transmitted by every other VLAN Endpoint on the multipoint network based at least on part on traffic frame counts collected in the first sample of frame count data.

* * * * *